(12) United States Patent
Muramatsu

(10) Patent No.: US 9,637,135 B2
(45) Date of Patent: May 2, 2017

(54) DRIVING ASSISTANCE DEVICE, DRIVING ASSISTANCE METHOD, AND COMPUTER READABLE MEDIUM

(71) Applicant: TOYOTA JIDOSHA KABUSHIKI KAISHA, Toyota-shi, Aichi-ken (JP)

(72) Inventor: Yoshiyuki Muramatsu, Aichi-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/936,158

(22) Filed: Nov. 9, 2015

(65) Prior Publication Data

US 2016/0159370 A1 Jun. 9, 2016

(30) Foreign Application Priority Data

Dec. 4, 2014 (JP) ................................. 2014-246249

(51) Int. Cl.
*G05D 1/00* (2006.01)
*B60Q 1/00* (2006.01)
*B60W 50/14* (2012.01)

(52) U.S. Cl.
CPC .................... *B60W 50/14* (2013.01)

(58) Field of Classification Search
USPC ............................................... 701/1; 340/457
See application file for complete search history.

(56) References Cited

U.S. PATENT DOCUMENTS

| | | | | |
|---|---|---|---|---|
| 8,874,301 | B1* | 10/2014 | Rao ...................... | B60K 28/066 180/272 |
| 8,909,428 | B1* | 12/2014 | Lombrozo ........... | B62D 15/025 701/41 |
| 9,201,421 | B1* | 12/2015 | Fairfield ............... | B60W 40/04 |
| 9,365,213 | B2* | 6/2016 | Stenneth ............... | B60W 30/00 |
| 2012/0046817 | A1 | 2/2012 | Kindo et al. | |
| 2014/0018993 | A1 | 1/2014 | Kindo et al. | |
| 2014/0088814 | A1* | 3/2014 | You ...................... | G05D 1/0061 701/23 |

(Continued)

FOREIGN PATENT DOCUMENTS

| | | |
|---|---|---|
| JP | 2010-264829 A | 11/2010 |
| JP | 2012-051441 A | 3/2012 |
| JP | 2014-106854 A | 6/2014 |

*Primary Examiner* — Tyler Paige
(74) *Attorney, Agent, or Firm* — Oliff PLC

(57) ABSTRACT

A driving assistance device includes: a switch information acquisition section that acquires switch information indicating a switch from a first travelling operation state to a second travelling operation state, in which the occupant drives manually; a degree of tension information acquisition section that acquires information indicating a degree of tension of an occupant; a perception state presentation section that presents a perception state indicating a state of stimulus perceived by the occupant using touch; and a controller that, when the switch information has been acquired, causes a first perception state corresponding to the degree of tension to be presented by the perception state presentation section as the perception state, and causes presentation by the perception state presentation section so as to transition from the first perception state to a second perception state determined for when the occupant manually drives.

7 Claims, 10 Drawing Sheets

(56) References Cited

U.S. PATENT DOCUMENTS

| | | | | |
|---|---|---|---|---|
| 2014/0136045 A1* | 5/2014 | Zhu | G05D 1/0214 | 701/23 |
| 2014/0244096 A1* | 8/2014 | An | G05D 1/0055 | 701/25 |
| 2014/0249722 A1* | 9/2014 | Hegemann | G08G 1/16 | 701/41 |
| 2014/0303827 A1* | 10/2014 | Dolgov | B60W 30/00 | 701/23 |
| 2015/0066284 A1* | 3/2015 | Yopp | B60W 30/00 | 701/29.2 |
| 2015/0070160 A1* | 3/2015 | Davidsson | B60W 50/14 | 340/457 |

\* cited by examiner

DRIVING ASSISTANCE DEVICE, DRIVING ASSISTANCE METHOD, AND COMPUTER READABLE MEDIUM

CROSS-REFERENCE TO RELATED APPLICATION

This application claims priority under 35 USC 119 from Japanese Patent Application No. 2014-246249 filed Dec. 4, 2014, the disclosure of which is incorporated by reference herein.

BACKGROUND

Technical Field

Technology disclosed herein relates to a driving assistance device, a driving assistance method, and a computer readable medium.

Related Art

Technology has been proposed for assisting driving of a vehicle by an occupant (for example, a driver). A device that, in order to increase safety of automatic driving control of the vehicle, issues a notification to the occupant prompting disengagement of automatic driving when specific conditions for automatic driving are not fulfilled during automatic driving of a vehicle is known as an example of technology for assisting driving of a vehicle (for example, see Japanese Patent Application Laid-Open (JP-A) No. 2014-106854.

Moreover, technology is known that disengages automatic driving of a vehicle when switching to manual driving in cases in which determination is made that vehicle safety can be assured, in order to appropriately switch from automatic driving that assists driving of the vehicle to manual driving by the occupant (for example, see JP-A No. 2010-264829). Moreover, such technology enables notifications to be issued prompting the occupant to switch to manual driving when automatic driving cannot continue.

However, in cases in which a notification prompting disengagement of automatic driving or notification prompting a switch to manual driving is made, there are concerns that automatic driving may be disengaged without the occupant realizing that transition was made to manual driving as a result of, for example, the occupant being unable to confirm the notification, and smooth transition to manual driving may not be possible. Moreover, in some cases the occupant may think that authority over driving is entrusted to the vehicle side, and the occupant may be less vigilant than when driving manually, and may adopt a negligent attitude toward driving during automatic driving that assists driving of the vehicle. In such cases, there are concerns that there may be a switch from automatic driving to manual driving while the occupant remains unprepared for the transition to manual driving, and smooth transitioning to manual driving may not be possible.

An exemplary embodiment of the present invention provides a driving assistance device, a driving assistance method, and a driving assistance program that are capable of presenting information perceivable by the occupant to enable the occupant to smoothly transition to manual driving.

SUMMARY

A driving assistance device of a first aspect of the present invention includes: a switch information acquisition section that acquires switch information indicating a switch from a travelling operation state, in which a driving assistance section performs driving assistance processing to assist driving of a vehicle by an occupant, to a travelling operation state, in which the occupant drives manually; a degree of tension information acquisition section that acquires information indicating a degree of tension of the occupant; a perception state presentation section that presents a perception state indicating a state of stimulus perceived by the occupant using touch; and a controller that, in cases in which the switch information has been acquired, causes a first perception state corresponding to the degree of tension to be presented by the perception state presentation section as the perception state, and causes presentation by the perception state presentation section so as to transition from the first perception state to a second perception state determined for when the occupant manually drives.

According to the first aspect of the present invention, the switch information and the information indicating the degree of tension of the occupant are acquired. The switch information indicates a switch from a travelling operation state, in which the driving assistance section performs driving assistance processing, to a travelling operation state, in which the occupant drives manually. The perception state presentation section is capable of presenting the perception state indicating the state of the stimulus perceived by the occupant by touch. In cases in which the switch information has been acquired, the controller causes the first perception state corresponding to the degree of tension to be presented by the perception state presentation section as the perception state, and causes presentation by the perception state presentation section so as to transition from the first perception state to the second perception state determined for when the occupant manually drives. Thus, in cases in which the switch information has been acquired, the perception state can be presented so as to correspond to the degree of tension of the occupant, the perception state can be presented so as to correspond to the degree of tension suitable for manual driving, enabling smooth transition to manual driving.

Moreover, in a driving assistance device according to a second aspect of the present invention, configuration may be made such that: the perception state presentation section is capable of presenting the perception state indicating at least one state out of rigidity or temperature; and the controller employs a set value that identifies the at least one state of out of a first rigidity or a first temperature as the first perception state, and employs a set value identifying at least one state out of a second rigidity or a second temperature as the second perception state. This enables the perception state to be presented by sense of touch using at least one out of the rigidity or the temperature, thereby enabling the cognitive load on the occupant to be reduced compared to cases in which information is transmitted by indicating with a text display, audio presentation or the like.

Moreover, in a driving assistance device according to a third aspect of the present invention, configuration may be made such that: the perception state presentation section includes a vibrating section capable of vibrating with a specific cycle; and the controller causes the first perception state to be presented, causes the vibrating section to vibrate so as to correspond to a breathing cycle in which an inhalation and exhalation pair by the occupant is a single cycle, and so as to employ a first cycle corresponding to the degree of tension, and causes the vibrating section to vibrate so as to transition from a first vibration state of the vibration section vibrated by employing the first cycle, to a second vibration state in which the vibrating section vibrates employing a second cycle determined to correspond to the breathing cycle for when the occupant is driving manually.

Transition to a breathing rate suitable for manual driving is thereby possible, enabling a switch to the travelling operation state in which the occupant drives manually to be perceivably provided to the driver. This enables the occupant to be suppressed from feeling unsettled by a sudden switching from automatic driving to manual driving, and enables smooth transition to be made from automatic driving to manual driving.

In a driving assistance device according to a fourth aspect of the present invention, configuration may be made such that the perception state presentation section is provided to at least one out of a steering wheel or a seat. This enables information to be reliably presented to the occupant at a position that the occupant touches while manually driving.

Moreover, in a driving assistance device according to a fifth aspect of the present invention, configuration may be made such that the controller stores plural guiding patterns indicating passage of the transition from the first perception state to the second perception state, and causes the perception state to transition from the first perception state to the second perception state based on a guiding pattern selected from the plural guiding patterns. This enables an appropriate perception state for providing to the occupant to be easily selected, and enables smooth transition to be made to manual driving.

A driving assistance method according to a sixth aspect of the present invention includes: acquiring switch information indicating a switch from a travelling operation state, in which a driving assistance section performs driving assistance processing to assist driving of a vehicle by an occupant, to a travelling operation state, in which the occupant drives manually; acquiring information indicating a degree of tension of the occupant; and in cases in which the switch information has been acquired, causing presentation of a first perception state corresponding to the degree of tension on a perception state presentation section that presents a perception state indicating a state of stimulus perceived by the occupant using touch, and causing presentation so as to transition from the first perception state to a second perception state determined for when the occupant manually drives.

A driving assistance program stored on a computer-readable medium according to a seventh aspect of the present invention causes a computer to execute processing, the processing including: acquiring switch information indicating a switch from a travelling operation state, in which a driving assistance section performs driving assistance processing to assist driving of a vehicle by an occupant, to a travelling operation state in which the occupant drives manually; acquiring information indicating a degree of tension of the occupant; and in cases in which the switch information has been acquired, causing a first perception state corresponding to the degree of tension to be presented and causing presentation so as to transition from the first perception state to a second perception state determined for when the occupant manually drives, by a perception state presentation section that presents a perception state indicating a state of stimulus perceived by the occupant using touch.

Thus, the driving assistance method and the driving assistance program also enable smooth transition to manual driving due to the occupant aboard the vehicle perceiving stimulus by the perception state.

An embodiment of the present invention described above exhibits an advantageous effect of enabling information to be presented so as to be perceivable by the occupant to enable the occupant to be smoothly transitioned from a travelling operation state in which driving of the vehicle is assisted to manual driving.

BRIEF DESCRIPTION OF THE DRAWINGS

Exemplary embodiments of the present invention will be described in detail based on the following figures, wherein.

DETAILED DESCRIPTION

Detailed explanation follows regarding examples of exemplary embodiments according to technology disclosed herein, with reference to the drawings.

First Exemplary Embodiment

Figure 1:
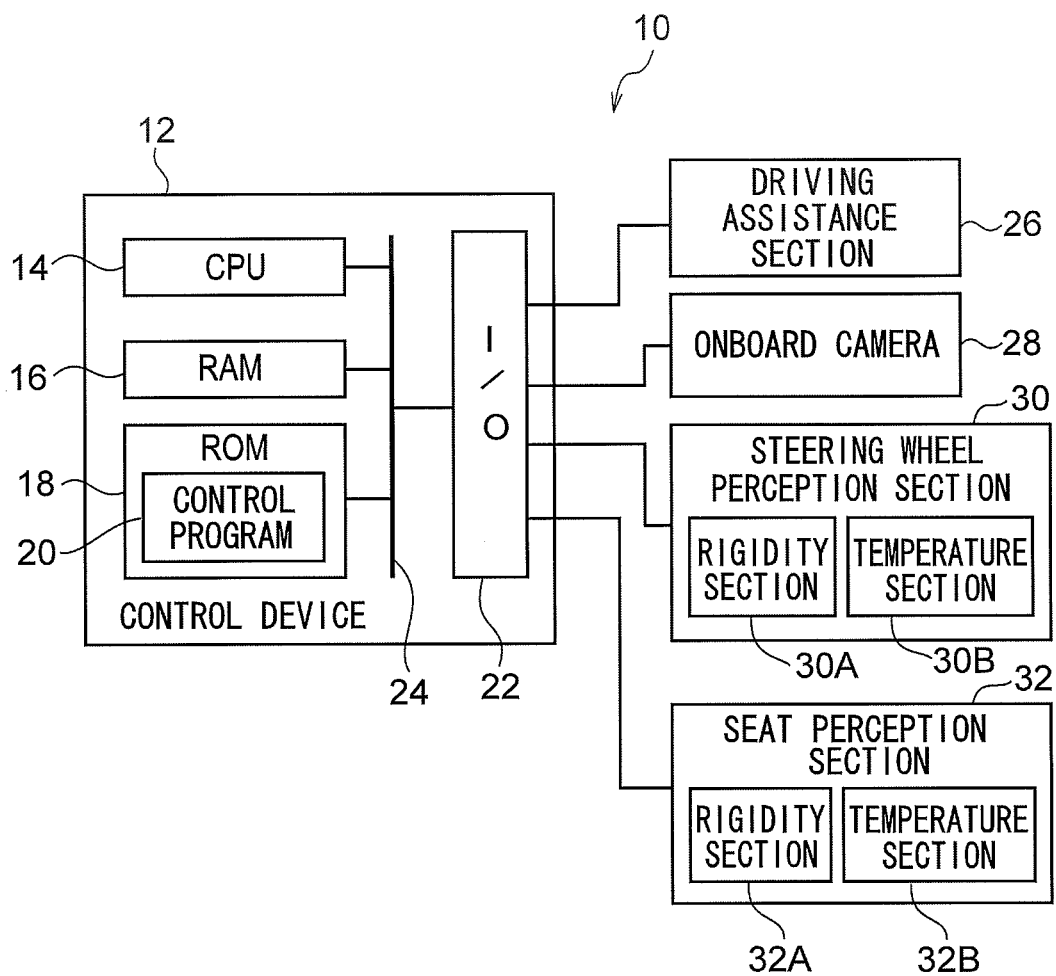
FIG. 1 is a block diagram illustrating an example of a configuration of a driving assistance device according to a first exemplary embodiment.

FIG. 1 illustrates an example of a configuration of a driving assistance device 10 according to an exemplary embodiment according to technology disclosed herein. The driving assistance device 10 is an example of a driving assistance device according to technology disclosed herein. The driving assistance device 10 is mounted to a vehicle, and is a device that assists driving of the vehicle by an occupant (for example, a driver, referred to as the driver hereafter).

As illustrated in FIG. 1, the driving assistance device 10 includes a control device 12 (an example of a controller according to technology disclosed herein), a driving assistance section 26, an onboard camera 28 (an example of a degree of tension information acquisition section according to technology disclosed herein), a steering wheel perception section 30 (an example of a perception state presentation section according to technology disclosed herein), and a seat perception section 32 (an example of a perception state presentation section according to technology disclosed herein). The control device 12 includes a CPU 14, RAM 16, ROM 18 serving as a nonvolatile storage section that stores a control program 20, and an input/output interface (I/O) 22 that communicates with an external device, and these components are connected to one another by a bus 24. Moreover, the driving assistance section 26, the onboard camera 28, the steering wheel perception section 30, and the seat perception section 32 are connected to the I/O 22.

The driving assistance section 26 includes an automatic steering system, and performs driving assistance processing such as steering maneuvers to assist driving of the vehicle by the driver. The driving assistance section 26 stores information indicating the travelling operation state of the vehicle, and is capable of outputting the stored information indicating the travelling operation state of the vehicle. The information indicating the travelling operation state of the vehicle is information indicating a manual driving state in which the vehicle is being manually driven by the driver, or information indicating an automatic driving state in which driving of the vehicle by the driver is assisted by the driving assistance section 26.

The driving assistance section 26 outputs specific information related to driving assistance of the vehicle. As the specific information, the driving assistance section 26 can output switch information indicating a switch in the travelling operation state of the vehicle from the automatic driving state to the manual driving state.

For example, during execution of driving assistance processing, the driving assistance section 26 can automatically end (disengage) driving assistance processing and perform processing to prompt manual driving of the vehicle by the driver, according to the behavior or surrounding situation of the vehicle. In such cases, the driving assistance section 26 outputs switch information in order to prompt the driver to manually drive the vehicle. As driving assistance technology in vehicles improves, as switch information, the driving assistance section 26 may output switch information as information indicating that a transition of authority over driving will occur in cases in which authority over driving of the vehicle returns to the driver from the vehicle side, namely, cases in which a switch is made from automatic driving by driving assistance processing to manual driving by the driver.

The driving assistance section 26 may include a communications device that performs information exchange between the vehicle and the exterior of the vehicle, and that receives surrounding information. Examples of the communications device include a communications device that receives a road situation by road-to-vehicle communications of a wireless communications device or the like using short range communications of dedicated short range communications (DSRC). Examples of information indicating the road situation received by the road-to-vehicle communications, this being surrounding information, include information indicating the shape and state of the lane or road, such as the curvature or road surface cant of the traveled vehicle lane, a positional relationship of the vehicle with respect to a vehicle lane, a positional relationship with another vehicle during travelling, and a surrounding volume of traffic. The driving assistance section 26 may include a navigation system as an example of a device for obtaining surrounding information.

The onboard camera 28 is provided to an upper portion inside the vehicle cabin, and functions as a sensor for detecting the degree of tension of the driver. The onboard camera 28 captures an image of the driver, and outputs the captured image to the control device 12. The control device 12 identifies the posture, and a position of a portion (for example, the face) of the body, of the driver by image processing the captured image, and finds the degree of tension. For example, the control device 12 selects an image resembling the captured image of the face of the driver from out of the images of the driver expressions corresponding to plural predetermined degrees of tension, and takes the degree of tension indicated by the selected image as the current degree of tension of the driver. The degree of tension of the driver is sometimes expressed in the posture of the driver. For example, during execution of driving assistance processing, sometimes a transition is made to a relaxed state in which the seat is reclined, in contrast to the posture of the driver when manual driving. In such cases, the posture of the driver may be identified from the captured image, and the amount of change in the identified posture of the driver from the posture of the driver when driving manually may be taken as the current degree of tension of the driver.

Note that with regards to the degree of tension, the onboard camera 28 may be replaced with an infrared camera, the body temperature of the driver may be detected using the infrared camera, and based on the detected body temperature, a higher degree of tension may be found the higher the body temperature. The image processing for detecting the degree of tension of the driver from the captured image is not limited to the above.

The steering wheel perception section 30 is provided to a steering wheel 34 (see FIG. 2), and is a functional section capable of applying, as a perception state, stimulus from the steering wheel 34 to the driver. The perception state indicates a state of stimulus perceived by the occupant using touch. The steering wheel perception section 30 includes a rigidity section 30A that presents stimulus to the driver by adjusting the rigidity of the steering wheel 34, and a temperature section 30B such as a Peltier device that presents stimulus to the driver by adjusting the temperature of the steering wheel 34.

The steering wheel perception section 30 can apply stimulus to the driver from the steering wheel 34 in a perception state using a stimulus value corresponding to the degree of tension of the driver. Namely, the stimulus due to the perception state can be determined by a stimulus value, and the stimulus value can be made to correspond to the degree of tension of the driver. The steering wheel perception section 30 can accordingly present a perception state corresponding to the degree of tension of the driver to the driver using the input stimulus value. The stimulus value corresponding to the degree of tension of the driver may be found in advance experimentally. More specifically, in the rigidity section 30A of the steering wheel perception section 30, the value indicating the rigidity of the steering wheel 34 is the stimulus value, and in the temperature section 30B, the value indicating the temperature of the steering wheel 34 is the stimulus value. The correspondence between the degree of tension of the driver and the stimulus value is stored in the ROM 18.

Figure 2:
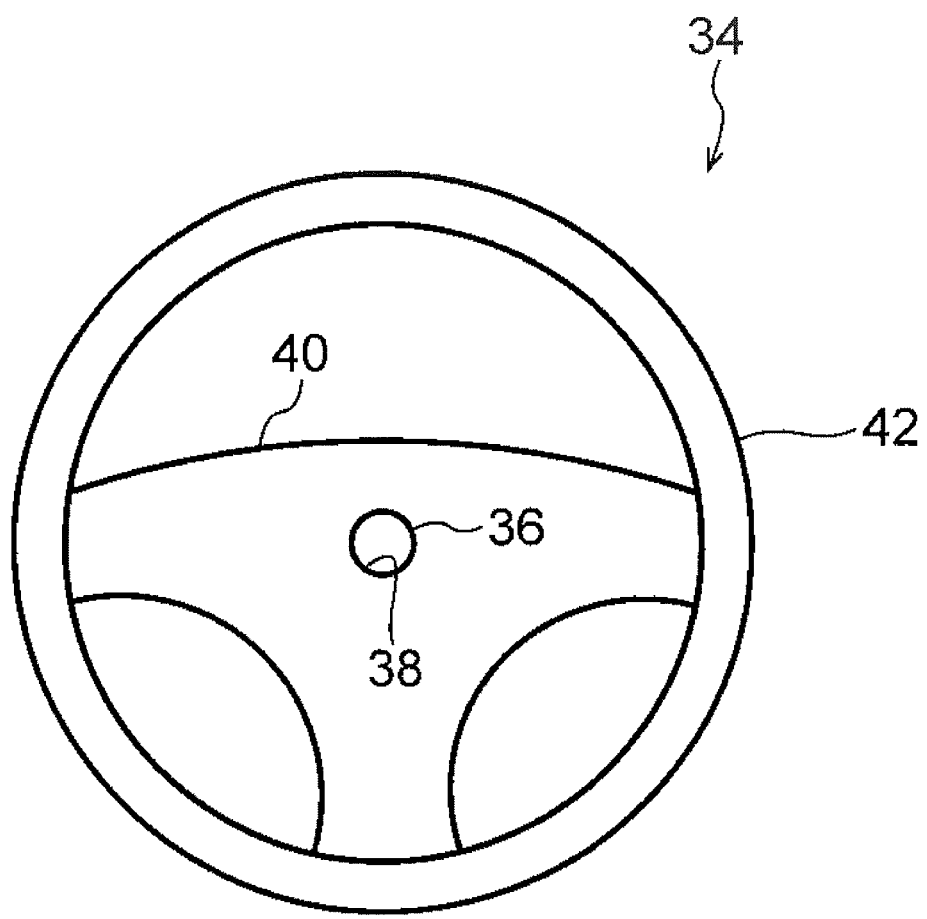
FIG. 2 is an elevation view illustrating an example of a steering wheel.

FIG. 2 illustrates an example of the steering wheel 34 provided with the steering wheel perception section 30.

A boss 36 is provided to the steering wheel 34, and the boss 36 is disposed at the central portion of the steering wheel 34. A vehicle rear side end (upper end) of a circular shaft shaped steering wheel shaft 38 is fixed to the boss 36 as a steering axis, and the steering wheel 34 is configured rotatable as a unit with the steering wheel shaft 38, with the steering wheel shaft 38 serving as a central axis. A spoke section 40 is fixed to an end portion (upper end) of the steering wheel shaft 38. The spoke section 40 extends from the boss 36 toward the radial direction outside of the steering wheel 34, and is rotatable as a unit with the boss 36.

A circular ring shaped rim section 42 is fixed to leading ends of the spoke section 40. The circular ring shaped rim section 42 is disposed along the circumferential direction of the steering wheel 34 (the length direction of the circular ring shaped rim section 42), the central axis of the rim section 42 is aligned with the central axis of the steering wheel shaft 38, and the rim section 42 is rotatable as a unit with the boss 36 and the spoke section 40. The driver is able to grip the rim section 42, and the steering wheel shaft 38 is rotated by the steering wheel 34 being rotationally operated while in a state of being gripped by the driver, thereby steering the vehicle.

Figure 3:
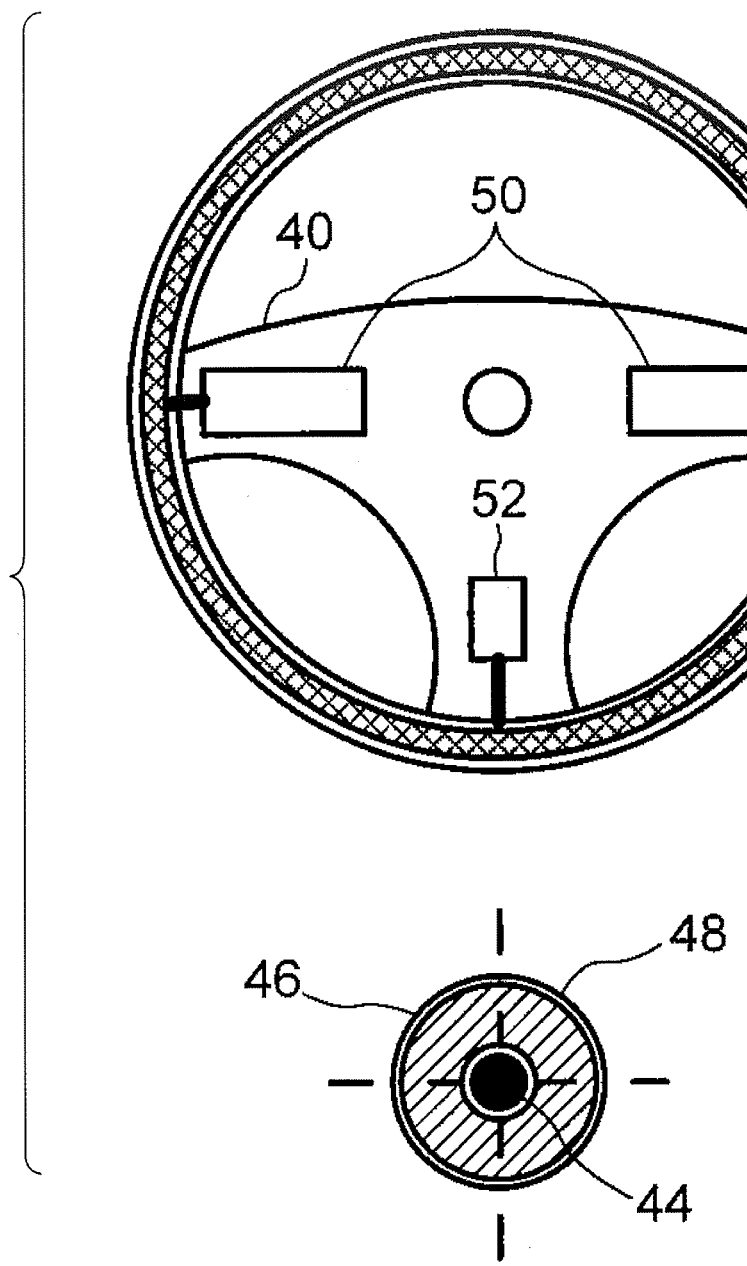
FIG. 3 is a block diagram illustrating an example of a configuration including a steering wheel interior.

FIG. 3 illustrates an example of an internal structure of the steering wheel 34 including the steering wheel perception section 30. FIG. 3 also illustrates a partial cross-section of the rim section 42.

A substantially circular column shaped steering wheel core member 44 (a steering wheel base member) made from urethane, wood, or the like is provided to the rim section 42 as a central member. The steering wheel core member 44 is disposed along the entire circumferential direction of the steering wheel 34. A steering wheel bag 46 is provided enclosing the steering wheel core member 44. In the present exemplary embodiment, the steering wheel bag 46 is configured capable of being internally filled with a fluid, and the rigidity of the steering wheel bag 46 can be changed by inflow or outflow of fluid caused by a pump 50 that moves fluid provided in the spoke section 40 in and out. Inflow and outflow of fluid caused by the pump 50 is controlled by the control device 12. The pump 50 and the steering wheel bag 46 accordingly function as the rigidity section 30A.

Moreover, the steering wheel core member 44 and the steering wheel bag 46 are housed in a substantially circular column shaped steering wheel outer peripheral member 48 serving as an outer peripheral member that is made from urethane or the like. Heating lines connected to a heat source 52 such as a Peltier device are embedded in the steering wheel outer peripheral member 48, and the external temperature of the steering wheel 34 can be changed by supply of energy from the heat source 52. The heat source 52 and the steering wheel outer peripheral member 48 accordingly function as the temperature section 30B.

As illustrated in FIG. 1, the seat perception section 32 is provided with a rigidity section 32A that presents stimulus to the driver by adjusting the rigidity of a seat 54, and a temperature section 32B that presents stimulus to the driver by adjusting the temperature of the seat 54. The seat perception section 32 is provided to the seat 54 (see FIG. 4), and is a functional section capable of applying stimulus from the seat 54 to the driver as the perception state.

Similarly to the steering wheel perception section 30, the seat perception section 32 can apply stimulus to the driver from the seat 54 using the perception state according to the stimulus value corresponding to the degree of tension of the driver.

Figure 4:
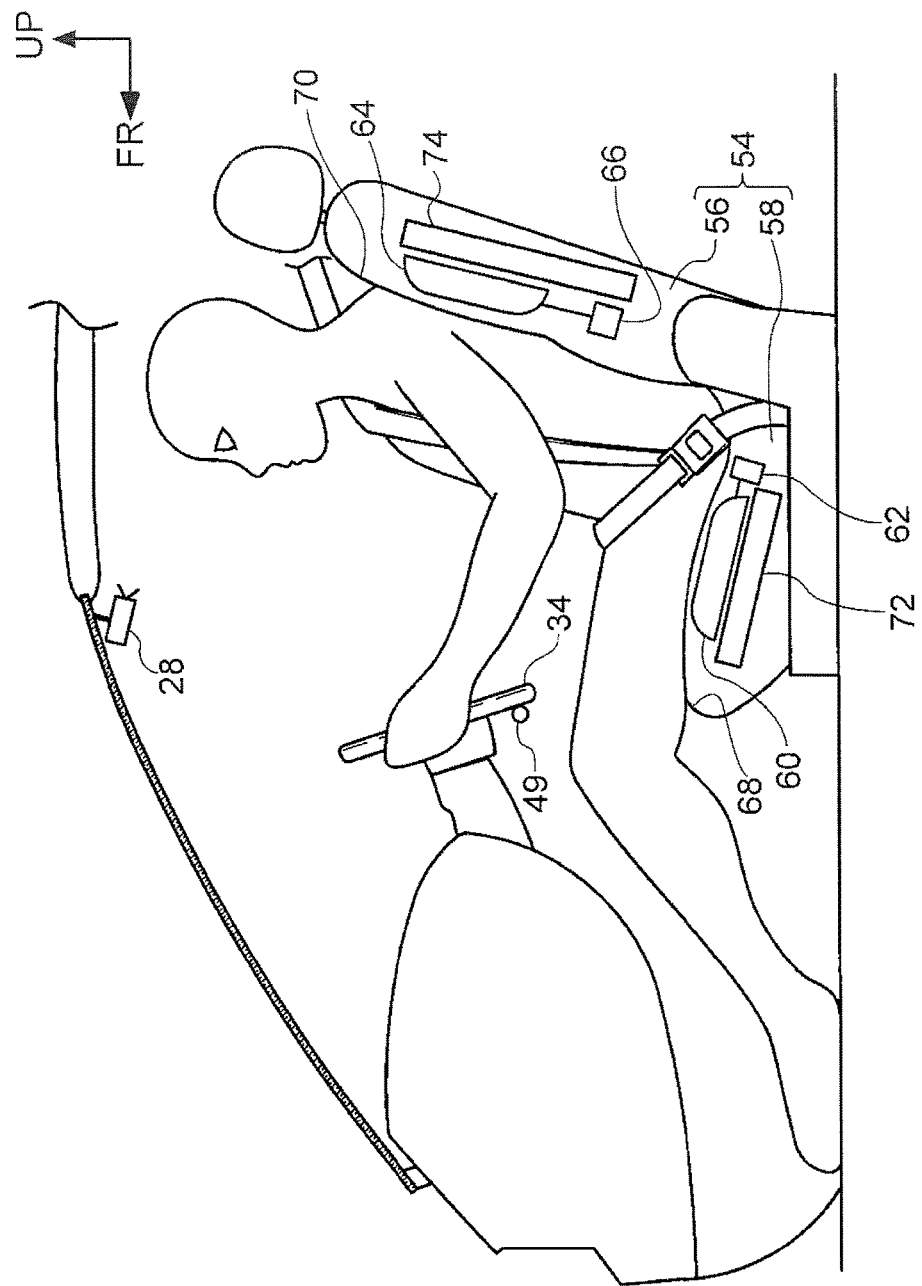
FIG. 4 is a block diagram illustrating an example of a configuration of a seat.

FIG. 4 illustrates an example of a seat 54 provided with the seat perception section 32. In FIG. 4, the arrow UP and the arrow FR indicate the vehicle up-down direction upper side and the vehicle front-rear direction front side.

As illustrated in FIG. 4, a seat bag 60 for a seat surface is provided inside a seat surface portion 58 of the seat 54. The seat bag 60 is configured capable of being internally filled with a fluid and the rigidity of the seat bag 60 can be changed by inflow or outflow of fluid caused by a pump 62 that is provided inside the seat surface portion 58 and that moves fluid in and out. Inflow and outflow of fluid caused by the pump 62 is controlled by the control device 12. Similarly to in the seat surface portion 58, a seat bag 64 for a back surface is provided inside a back surface portion 56 of the seat 54. The rigidity of the seat bag 64 is changed by a pump 66 provided inside the back surface portion 56 by moving fluid in and out. Inflow and outflow of fluid by the pump 66 is controlled by the control device 12. The pumps 62, 66 and the seat bags 60, 64 accordingly function as the rigidity section 32A.

Moreover, a heater 68 is embedded in the driver side of the seat surface portion 58 of the seat 54, and the temperature of the seat surface portion 58 of the seat 54 is changed by the heater 68. A heater 70 is embedded in the driver side of the back surface portion 56 of the seat 54, and the temperature of the back surface portion 56 of the seat 54 is changed by the heater 70. The heaters 68, 70 accordingly function as the temperature section 32B.

Note that an actuator 49 that is a vibrator for a steering wheel may be attached to the steering wheel 34 of the vehicle. An actuator 72 that is a vibrator for a seat surface may be attached inside the seat surface portion 58 of the seat 54. An actuator 74 that is a vibrator for a seat surface may be attached inside the back surface portion 56 of the seat 54. Each of the actuators 49, 72, 74 that are vibrators may present stimulus to the driver by vibrating. Note that the actuators 49, 72, 74 are not limited to installation to the positions illustrated in FIG. 4 as long as they are capable of presenting stimulus to the driver by vibration.

The actuators 49, 72, 74 adjust rigidity and are thereby able to function as the rigidity section 30A and as the rigidity section 32A that present stimulus. For example, the extent of rigidity may be presented by the actuators 49, 72, 74 making the amplitude large or small when vibrating with a specific cycle.

The control device 12 functions as a controller of the driving assistance device according to technology disclosed herein due to the control program 20 being read from the ROM 18 and expanded into the RAM 16, and the CPU 14 executing the control program 20 that was expanded in to the RAM 16.

Note that the driving assistance device 10 is an example of a driving assistance device according to technology disclosed herein. Moreover, the control device 12 is an example of a switch information acquisition section, a degree of tension acquisition section, and a controller according to technology disclosed herein, and the steering wheel perception section 30 and the seat perception section 32 are examples of a perception state presentation section according to technology disclosed herein.

Explanation follows regarding the degree of tension of the driver when the travelling operation state of the vehicle switches from the automatic driving state to the manual driving state.

Figure 5:
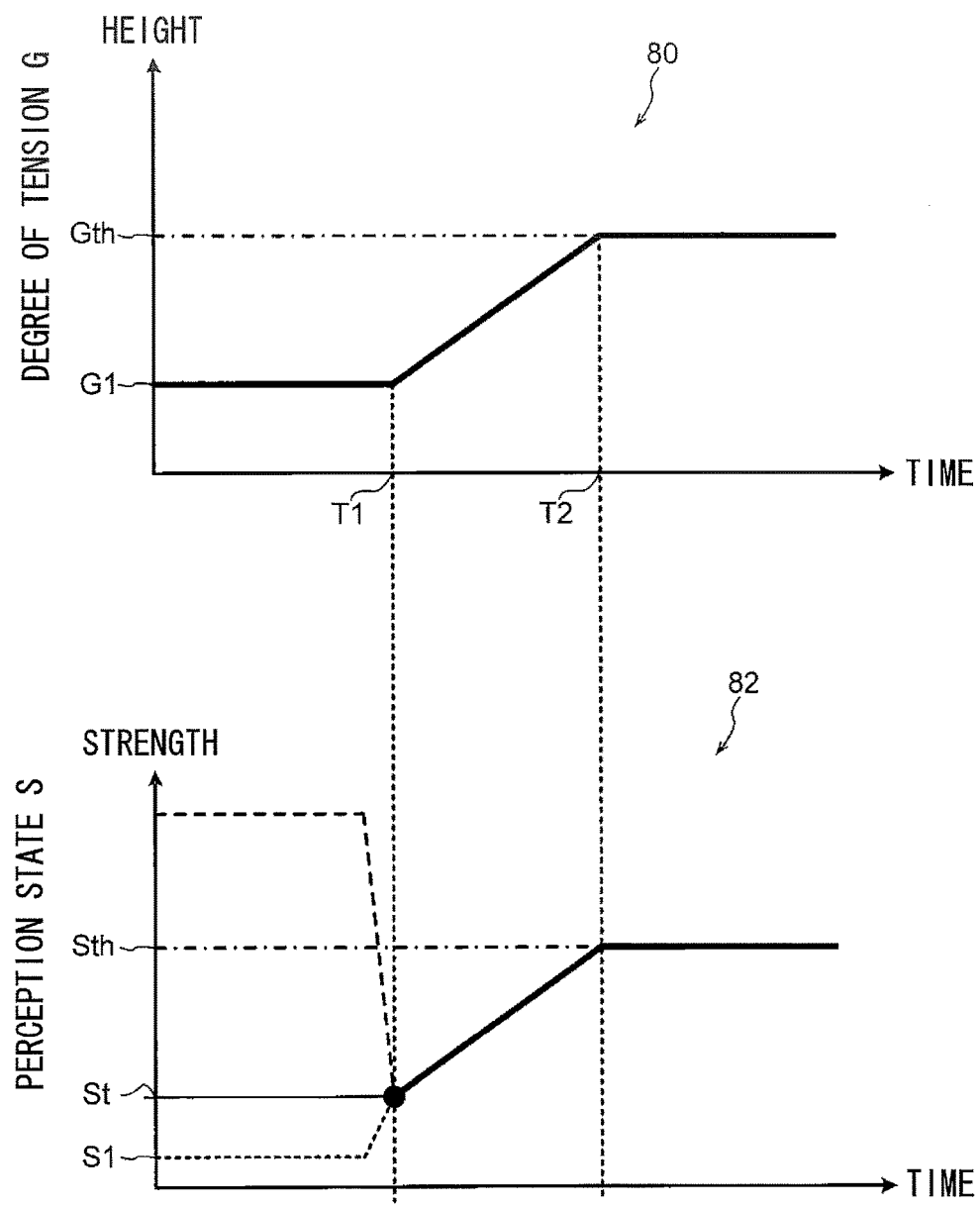
FIG. 5 is characteristics plots illustrating an example of degree of tension in a driver and an example of a perception state.

FIG. 5 illustrates an example of a change in the degree of tension of the driver as characteristic 80, and illustrates an example of a transition in a perception state as characteristic 82 (an example of a guiding pattern according to technology disclosed herein). As illustrated as characteristic 80 in FIG. 5, the driver thinks that authority over driving is entrusted to the vehicle side when in the automatic driving state (during automatic driving) in which vehicle driving is assisted. Sometimes, the driver is more relaxed than when driving manually, and a degree of tension G is a degree of tension G1 that is lower than a degree of tension Gth suitable for manual driving. In cases in which transition is made from automatic driving to manual driving in the state of the degree of tension G1, a transition time spanning from time T1 to time T2 is required for the degree of tension to change to the degree of tension Gth. Namely, when switching from automatic driving to manual driving, in such cases, the switch to manual driving is preferably made after the driver has been allowed to prepare in the lead up to transition to the manual driving state by the driver.

In cases in which a switch is made from the automatic driving state to the manual driving state in the present exemplary embodiment, first, a first perception state St is presented according to the current degree of tension of the driver. For example, the rigidity of the steering wheel 34 that depends on the rigidity section 30A of the steering wheel perception section 30 is adjusted from a rigidity of the steering wheel 34 based on a current perception state S1, to a rigidity based on the first perception state St according to the current degree of tension G1 of the driver. Namely, the rigidity of the steering wheel 34 is synchronized with the current degree of tension G1 of the driver. Note that the perception state may be any combination of the temperature of the steering wheel 34, and the rigidity and temperature of the seat 54. This enables the fact that the degree of tension G of the driver has been ascertained to be presented to the driver from the vehicle side, and enables a sense of security to be given to the driver.

Next, after the perception state S has been synchronized with the degree of tension G1 of the driver, a second perception state Sth is gradually presented corresponding to the degree of tension Gth suitable for manual driving by the driver. Accordingly, the driver is guided toward the second perception state Sth corresponding to the degree of tension Gth suitable for manual driving by gradually changing the perception state being presented. Namely, the driver can be guided to the degree of tension Gth suitable for manual driving by presenting the perception state S such that the perception state S presented to the driver is gradually changed from the first perception state St to the second perception state Sth, thus enabling the driver to be guided to the degree of tension Gth suitable for manual driving, and enabling a smooth transition to manual driving when switching from the automatic driving state to the manual driving state.

In the present exemplary embodiment, plural transitions of the perception state described above (the characteristic 82) may be stored in the ROM 18 as guiding patterns, and a guiding pattern that has been selected from the plural guiding patterns may be employed. Note that although FIG. 5 illustrates an example in which the perception state is caused to transition linearly, there is no limitation to linear transitions of the perception state, and a curved or nonlinear transition may be caused.

Figure 6:
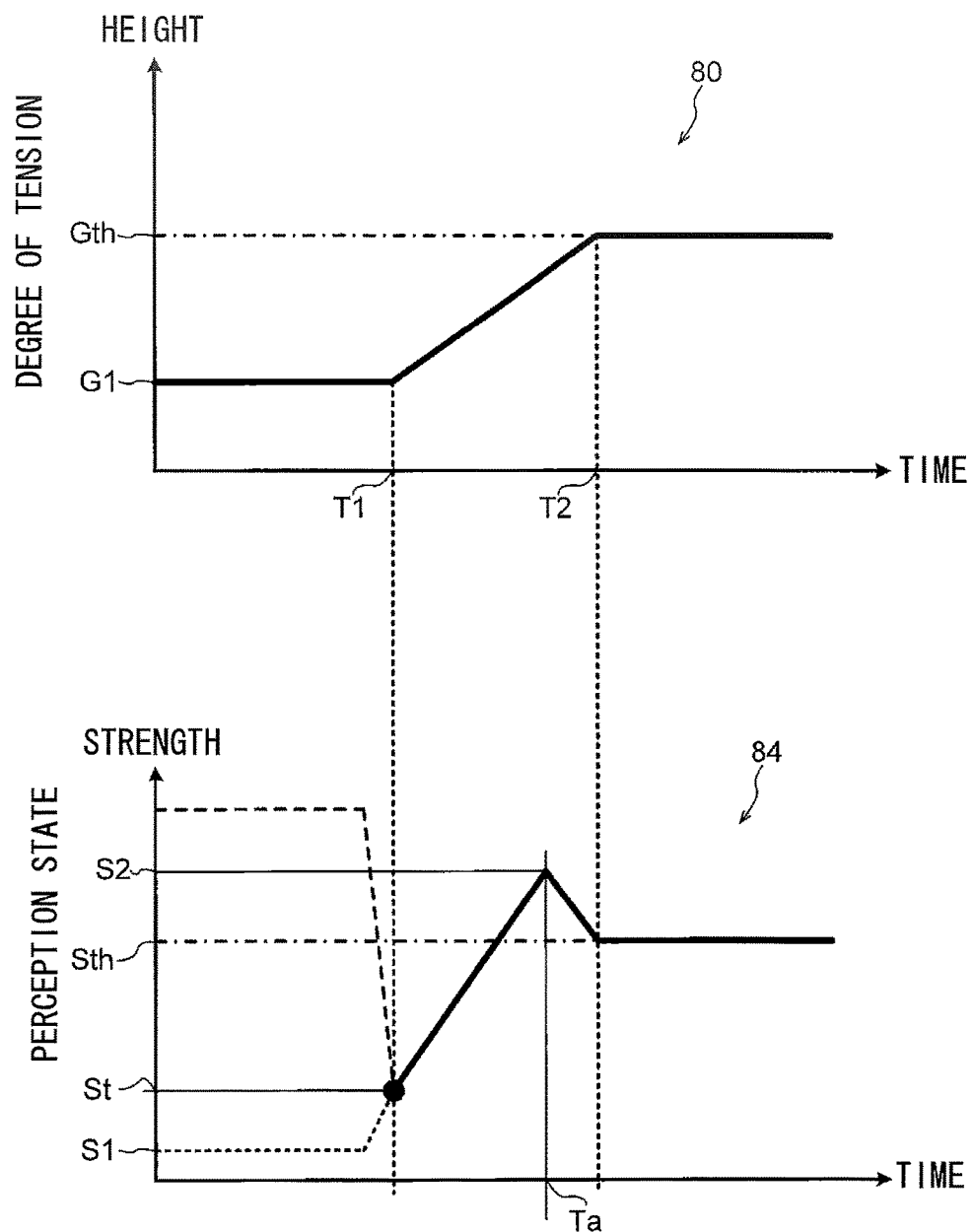
FIG. 6 is characteristic plots illustrating another example of a perception state.

FIG. 6 illustrates another example of a transition of the perception state (an example of a guiding pattern according to technology disclosed herein) as a characteristic 84. In the characteristic 84 illustrated in FIG. 6, the perception state is caused to fluctuate before changing the perception state S to the second perception state Sth corresponding to the degree of tension Gth suitable for manual driving. For example, before the rigidity of the steering wheel 34 is set to a rigidity according to the second perception state Sth suitable for manual driving, the rigidity of the steering wheel 34 transitions to a rigidity according to the perception state S2 having a higher rigidity, and then transitions to a rigidity according to the second perception state Sth. Accordingly, the driver can easily notice the transition to the second perception state Sth, and can be easily guided to the degree of tension Gth suitable for manual driving.

Figure 7:
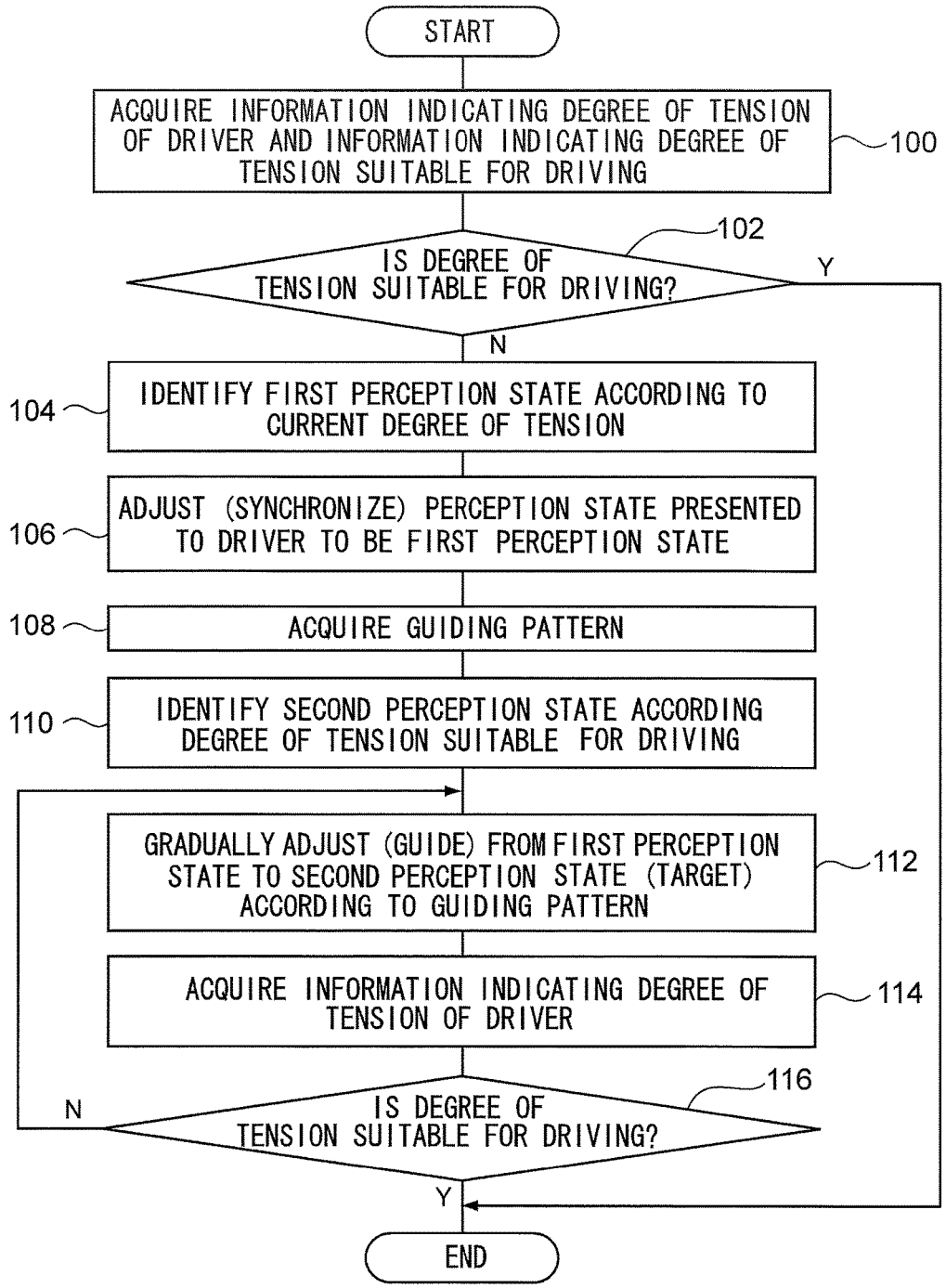
FIG. 7 is a flowchart illustrating an example of a flow of control processing.

Next, explanation follows regarding processing executed by the control device 12 of the driving assistance device 10 as operation of the present exemplary embodiment, with reference to the flowchart illustrated in FIG. 7. When the control device 12 acquires switch information output from the driving assistance section 26 via the I/O 22, the control device 12 executes the perception state control processing illustrated in FIG. 7.

At step 100, the control device 12 acquires information indicating the degree of tension G1 of the driver, and information indicating the degree of tension Gth suitable for driving. The information indicating the degree of tension G1 of the driver can be found by identifying the posture or the position of a portion of the body (for example, the face) of the driver by image processing performed by the control device 12 on captured images of the driver captured by the onboard camera 28. At step 100, the degree of tension found is acquired as the information indicating the degree of tension G1 of the driver. Moreover, the information indicating the degree of tension Gth is acquired by reading the degree of tension Gth stored in the ROM 18.

At the next step 102, determination is made as to whether or not the current degree of tension of the driver is a degree of tension suitable for driving. Namely, the control device 12 determines whether or not the degree of tension G1 of the driver and the degree of tension Gth suitable for driving acquired at step 100 match or are within a predetermined specific range of each other. The control device 12 ends the current processing routine when affirmative determination is made at step 102, and processing transitions to step 104 when negative determination is made at step 102.

At step 104, a first perception state corresponding to the current degree of tension G1 of the driver is identified. Namely, a stimulus value for at least one out of rigidity or temperature of the steering wheel 34, and a rigidity and temperature of the seat 54, is determined as the stimulus value corresponding to the current degree of tension G1 of the driver. At the next step 106, the perception state presented to the driver is adjusted to the first perception state. Namely, the control device 12 controls such that the stimulus according to the stimulus value determined at step 104 is presented by at least one out of the steering wheel perception section 30 or the seat perception section 32 corresponding to the stimulus value. Accordingly, one or more out of the rigidity and temperature of the steering wheel 34, and the rigidity and temperature of the seat 54, is synchronized with the current degree of tension G1 of the driver. This enables the fact that the degree of tension G1 of the driver has been ascertained to be presented to the driver from the vehicle side, and enables a sense of security to be given to the driver.

Next, at step 108, the control device 12 acquires a guiding pattern by reading the guiding patterns stored in the ROM 18. The guiding pattern acquired at step 108 may be a predetermined guiding pattern, or may be a guiding pattern selected from out of plural guiding patterns. In cases in which the guiding pattern is acquired by selecting from out of plural guiding patterns, guiding patterns employed by the steering wheel perception section 30 and the seat perception section 32 may each be predetermined and selected.

At the next step 110, a second perception state according to the degree of tension suitable for driving is identified. Namely, a stimulus value is determined for at least one out of the rigidity or temperature of the steering wheel 34, or the rigidity or temperature of the seat 54, as the stimulus value corresponding to the degree of tension Gth of the driver suitable for driving. At the next step 112, the perception state presented to the driver is adjusted to the second perception state according to the guiding pattern acquired at step 108. Namely, the control device 12 controls such that stimulus according to the stimulus value determined at step 110 is presented by at least one out of the steering wheel perception section 30 or the seat perception section 32 corresponding to the stimulus value. Accordingly, one or more out of the temperature and rigidity of the steering wheel 34, and the temperature and rigidity of the seat 54 perform the role of guiding to the degree of tension Gth suitable for driving by the driver.

At the next step 114, information indicating the degree of tension G1 of the driver is acquired similarly to at step 100, and processing transitions to step 116. At step 116, similarly to at step 102, determination is made as to whether or not the current degree of tension of the driver is a degree of tension suitable for driving, and the current processing routine ends in cases in which affirmative determination is made, and processing returns to step 112 in cases in which negative determination is made.

This enables the driver to be guided to the degree of tension Gth suitable for manual driving, and enables smooth transition to be made to manual driving in cases in which a switch is made from the automatic driving state to the manual driving state.

Sometimes, due to differences between individuals and the like, the degree of tension of the driver still falls short of the degree of tension Gth suitable for driving when the perception state has arrived at the second perception state corresponding to the degree of tension Gth suitable for driving. In such cases, a specific duration of standby may be performed, and a guiding pattern (for example, see FIG. 6) for re-notifying the driver may be presented after the specific duration.

Moreover, sometimes the driver wishes to be guided to an ascertained perception state when a perception state suitable for manual driving has already been ascertained in advance. In such cases, when guiding to the second perception state from the first perception state, a perception state ascertained by the driver in advance as being suitable for manual driving may be stored in the ROM 18, and the perception state may be read and employed as the perception state.

Figure 8:
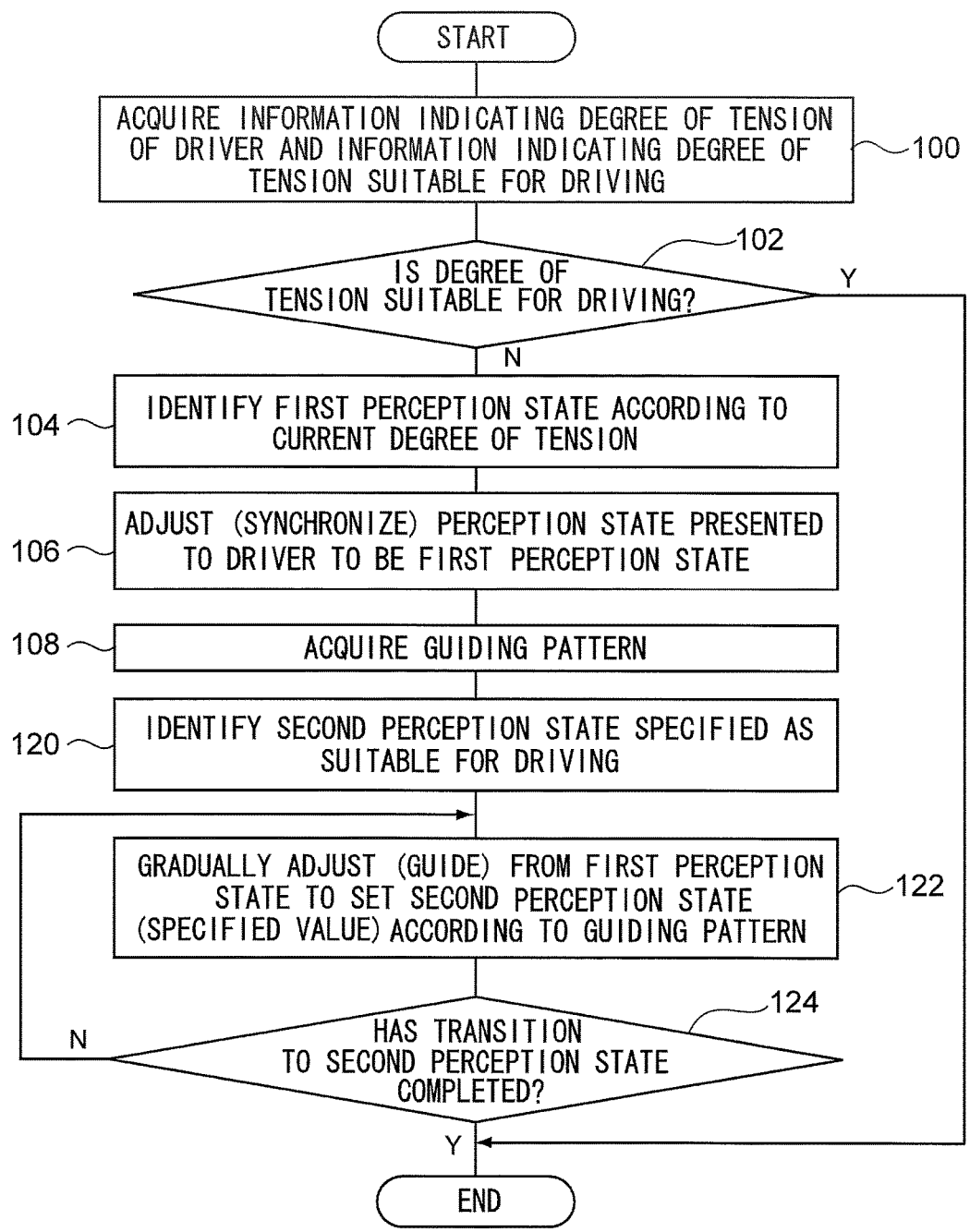
FIG. 8 is a flowchart illustrating a modified example of a flow of control processing.

FIG. 8 illustrates an example of a flow of processing for transitioning to a perception state specified by the driver. In the processing illustrated in FIG. 8, step 120 to step 124 are executed instead of the processing of step 112 to step 116 illustrated in FIG. 7.

At step 108, the control device 12 reads the guiding pattern stored in the ROM 18, and at the next step 120, the perception state specified by the driver is read from the ROM 18 and identified as the second perception state. At the next step 122, the perception state presented to the driver is adjusted to the second perception state according to the guiding pattern acquired at step 108. Namely, the second perception state is gradually adjusted until affirmative determination is made at step 124. The determination result of step 124 may be employed as the determination as to whether or not the current degree of tension of the driver is a degree of tension suitable for driving.

When the perception state suitable for manual driving has been pre-registered in the ROM 18 or the like by the driver in this manner, since the registered perception state is an environment suitable for driving by the driver, transitioning to the registered perception state enables a perception state to be provided that was registered according to the wishes of the driver.

As explained above, in the present exemplary embodiment, synchronizing the perception state with the degree of tension G1 of the driver during a switch from automatic driving to manual driving by the driver enables the fact that the degree of tension G1 of the driver has been ascertained to be presented to the driver from the vehicle side, and enables a sense of security to be given to the driver. Moreover, the driver can be guided to the degree of tension Gth suitable for manual driving, and smooth transition to manual driving can be made when switching from the automatic driving state to the manual driving state.

Moreover, the present exemplary embodiment enables information to be transmitted to the driver by presenting the perception state using the sense of touch, rather than by transmitting information using a display such a text display or an audio display, enabling the cognitive load on the driver to be reduced.

Second Exemplary Embodiment

Explanation next follows regarding a second exemplary embodiment. Note that since the second exemplary embodiment has a configuration similar to that of the first exemplary embodiment, corresponding configuration is appended with the same reference numerals, and explanation thereof is omitted.

The present exemplary embodiment applies technology disclosed herein to a case in which the driver is guided to a degree of tension suitable for driving by presenting a perception state that applies stimulus according to the breathing rate of the driver.

Figure 9:
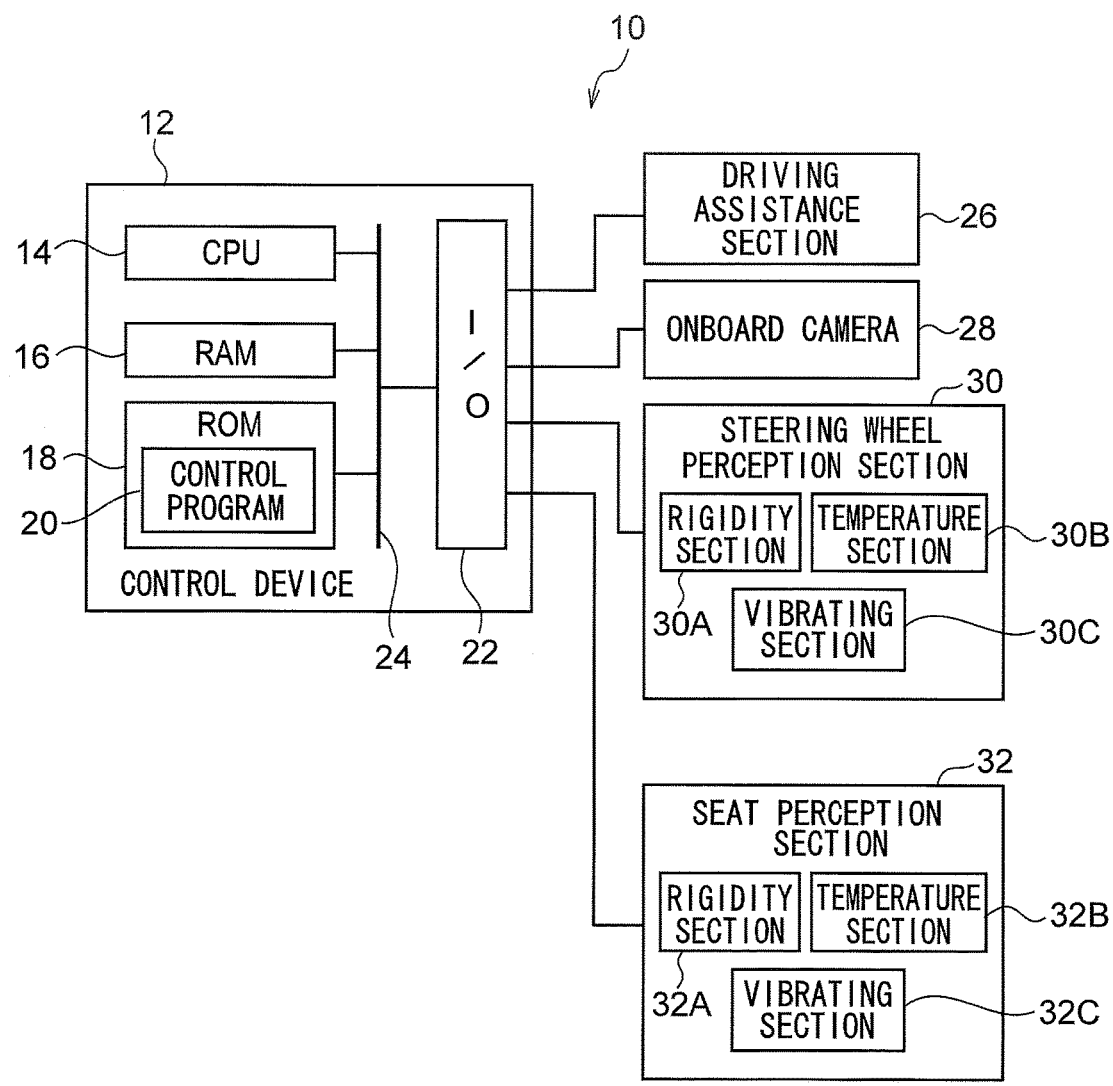
FIG. 9 is a block diagram illustrating an example of a configuration of a driving assistance device according to a second exemplary embodiment.

FIG. 9 illustrates an example of a configuration of a driving assistance device 10 according to the present exemplary embodiment. As illustrated in FIG. 9, a steering wheel perception section 30 according to the present exemplary embodiment includes a vibrating section 30C that presents stimulus to the driver by adjusting vibrations generated in a steering wheel 34, and a seat perception section 32 includes a vibrating section 32C that presents stimulus to the driver by adjusting vibrations generated in a seat 54. The vibrating section 30C corresponds to the actuator 49 illustrated in FIG. 4, and the vibrating section 32C corresponds to the actuators 72, 74. Moreover, information indicating a breathing rate suitable for driving is stored in ROM 18.

Figure 10:
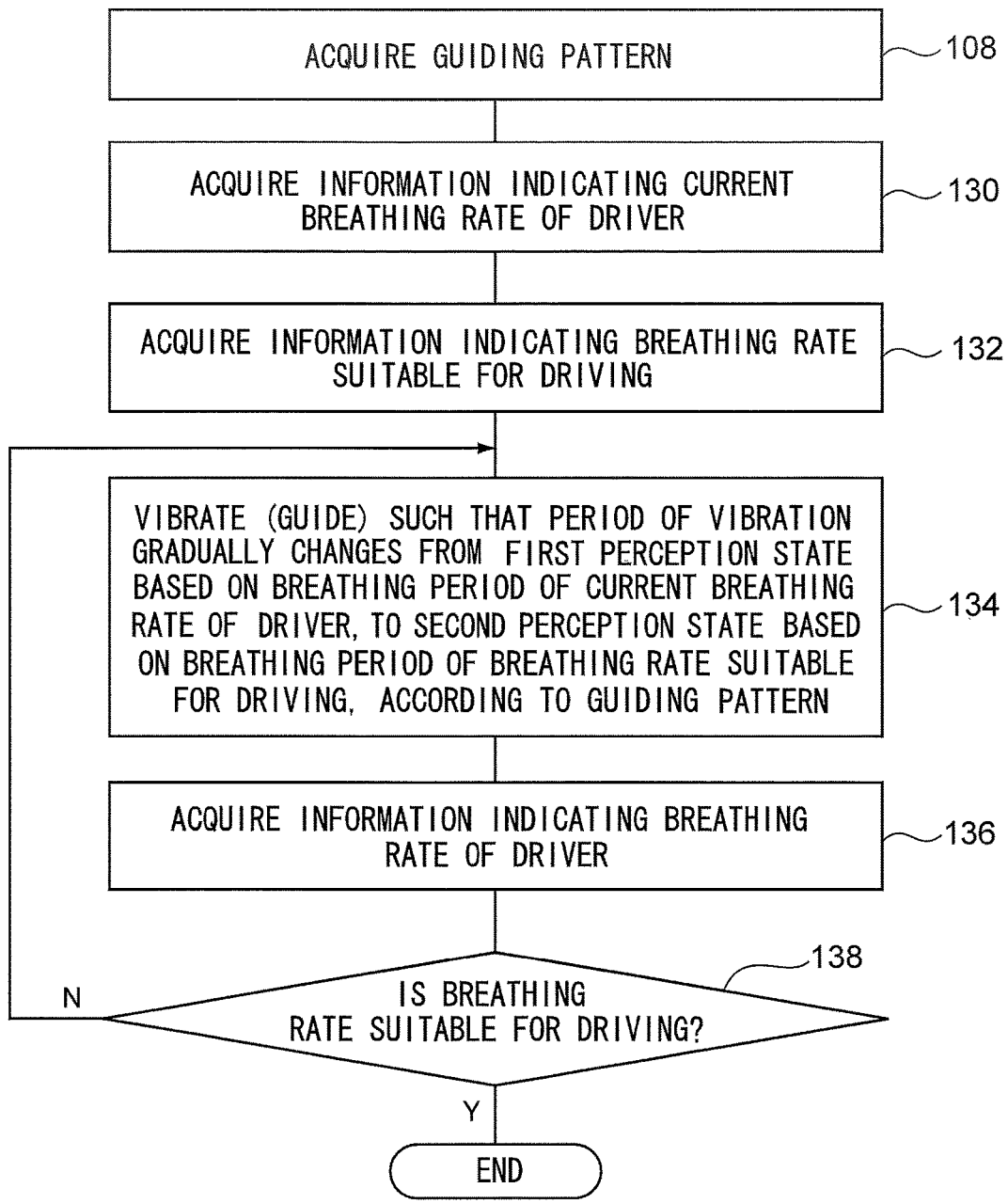
FIG. 10 is a flowchart illustrating an example of a flow of control processing according to the second exemplary embodiment.

Next, explanation follows regarding operation of the present exemplary embodiment. The present exemplary embodiment executes step 130 to step 138 illustrated in FIG. 10 instead of the processing that executes step 108 to step 116 illustrated in FIG. 7 to transition the perception state to the second perception state corresponding to the degree of tension Gth suitable for driving. FIG. 10 illustrates an example of a flow of processing that guides the breathing rate of the driver to a breathing rate suitable for driving.

At step 108, the control device 12 acquires the guiding pattern by reading the guiding pattern stored in the ROM 18.

Next, at step 130, the control device 12 acquires information indicating the current breathing rate of the driver. The information indicating the current breathing rate of the driver may be acquired based on plural captured images captured of the driver by an onboard camera 28 in time sequence. In the present exemplary embodiment, the onboard camera 28 functions as a sensor for detecting the breathing rate of the driver. Namely, the onboard camera 28 captures the driver, and outputs the captured image to the control device 12. The control device 12 finds the current breathing rate of the driver by image processing on the plural captured images captured in time sequence.

For example, the size of the chest circumference of the driver changes accompanying breathing, namely, inhalation and exhalation by the driver. The chest circumference of the driver is captured in time sequence by the onboard camera 28, the size of the chest circumference, for example, the horizontal direction length of the chest, is found for each captured image, and the captured image in which the size of the chest circumference is greatest, and the captured image in which the size of the chest circumference is smallest, are identified. The time from the largest chest circumference to the smallest chest circumference can be found since the capture cycle (time) of the captured images captured in time sequence is known. Accordingly, the breathing rate in a given time unit (for example, one minute) can be found from the duration of the breathing cycle in which an exhalation and inhalation pair of the driver is a single cycle. Accordingly, at step 130, the control device 12 finds the breathing rate from the plural captured images captured of the driver in time sequence by the onboard camera 28, and acquires information indicating the breathing rate found.

Next, at step 132, the control device 12 acquires the information indicating the breathing rate suitable for driving by reading from the ROM 18, and processing transitions to step 134.

At step 134, the vibrating sections 30C, 32C are controlled such that the cycle of vibration is gradually changed from the first perception state based on the breathing cycle of the current breathing rate of the driver to the second perception state based on the breathing cycle of the breathing rate suitable for driving, according to the acquired guiding pattern. Namely, the stimulus value of the first perception state and the second perception state are found, and the vibrating sections 30C, 32C are controlled so as to transition from the first perception state to the second perception state according to the stimulus values found.

More specifically, for the first perception state, a stimulus value in which the breathing cycle corresponding to the current breathing rate of the driver is taken as the cycle of vibration is determined for at least one out of the actuator 49 of the steering wheel 34 and the actuators 72, 74 of the seat 54. For the second perception state, a stimulus value in which the breathing cycle corresponding to the breathing rate of the driver suitable for driving is taken as the cycle of vibration is determined as the stimulus value of at least one out of the actuator 49 of the steering wheel 34 and the actuators 72, 74 of the seat 54.

Next, adjustment is made from the first perception state to the second perception state, according to the guiding pattern. Namely, due to the control device 12 gradually changing the cycle of vibration in at least one out of the actuator 49 of the steering wheel 34 and the actuators 72, 74 of the seat 54, the cycle of vibration of the actuator is gradually changed from the cycle of vibration based on the breathing cycle corresponding to the current breathing rate of the driver to a cycle of vibration based on a breathing cycle corresponding to a breathing rate of the driver suitable for driving. One or more out of the actuator 49 of the steering wheel 34 and the actuators 72, 74 of the seat 54 is thereby vibrated at the breathing cycle corresponding to the breathing rate of the driver suitable for driving, and the driver is guided to a state suitable for driving by the driver.

At the next step 136, information indicating the breathing rate of the driver is acquired similarly to in step 130, and processing transitions to step 138. At step 138, determination is made as to whether or not the current breathing rate of the driver is a breathing rate suitable for driving, and the current processing routine ends in cases in which affirmative determination is made, and processing returns to step 134 in cases in which negative determination is made.

The driver can thereby be guided to a breathing rate suitable for manual driving, and smooth transition can be made to manual driving when switching from the automatic driving state to the manual driving state.

As explained above, when a switch is made from automatic driving to manual driving by the driver in the present exemplary embodiment, preparation for the switch from automatic driving to manual driving can be perceivably provided to the driver since gradual transition to a breathing rate suitable for manual driving is possible. This enables the driver to be suppressed from feeling unsettled by sudden switching from automatic driving to manual driving, and enables smooth transition to be made from automatic driving to manual driving.

Although explanation has been given of cases in which an onboard camera is employed in order to detect the degree of tension of the driver in the above exemplary embodiments, other sensors may be employed for detecting the degree of tension of the driver. Examples of sensors for detecting the degree of tension of the driver include a detection device that detects heart rate and pulse. The detection device that detects heart rate and pulse may be worn on a part of the body of the driver such as the arm or chest, or may be provided in the cabin of the vehicle somewhere touched by the driver, for example, in the seat. Note that when the detection device is worn by the driver, a transmitting device that wirelessly transmits the detection result may be provided to the detection device, such that the control device 12 receives the transmission.

Processing performed by the control device 12 in the above exemplary embodiments may be distributed stored as a program on a recording medium or the like.

Although explanation has been given in which processing is performed by executing a program according to a flowchart in the above exemplary embodiments, the processing of the program may be implemented using hardware.

All cited documents, patent applications and technical standards mentioned in the present specification are incorporated by reference in the present specification to the same extent as if the individual cited document, patent application, or technical standard was specifically and individually indicated to be incorporated by reference.

What is claimed is:

1. A driving assistance device, comprising:
    a switch information acquisition section that acquires switch information indicating a switch from a first travelling operation state, in which a driving assistance section performs driving assistance processing that assists driving of a vehicle by an occupant of the vehicle, to a second travelling operation state, in which the occupant drives the vehicle manually;
    a degree of tension information acquisition section that acquires information indicating a degree of tension of the occupant;
    a perception state presentation section that causes a part of the vehicle to present a tactile stimulus to the occupant; and
    a controller that, in cases in which the switch information has been acquired, causes a first level of the tactile stimulus, corresponding to the degree of tension, to be presented by the perception state presentation section, and subsequently causes the perception state presentation section to transition from presenting the first level of the tactile stimulus to a second level of the tactile stimulus that is determined for when the occupant manually drives the vehicle, the second level being different from the first level.

2. The driving assistance device of claim 1, wherein:
    the perception state presentation section is configured to present the tactile stimulus by controlling at least one of a rigidity or a temperature of the part of the vehicle; and the controller employs a set value that identifies at least one of a first rigidity or a first temperature as the first level of the tactile stimulus, and employs a set value identifying at least one of a second rigidity or a second temperature as the second level of the tactile stimulus.

3. The driving assistance device of claim 1, wherein:

the perception state presentation section comprises a vibrating section capable of vibrating at a specific cycle; and the controller causes the first level of the tactile stimulus to be presented by causing the vibrating section to vibrate by employing a first cycle that corresponds to a breathing cycle in which an inhalation and exhalation pair by the occupant is a single cycle and that corresponds to the degree of tension, and by causing the vibrating section to transition from vibrating while employing the first cycle, to vibrating while employing a second cycle determined to correspond to the breathing cycle for when the occupant is driving manually, the second cycle being different from the first cycle.

4. The driving assistance device of claim 1, wherein the part of the vehicle is one or both of a steering wheel and a seat of the vehicle.

5. The driving assistance device of claim 1, wherein the controller stores a plurality of guiding patterns indicating a progress of the transition from the first level of the tactile stimulus to the second level of the tactile stimulus, and causes the level of the tactile stimulus to transition from the first level to the second level based on one of the guiding patterns selected from the plurality of guiding patterns.

6. A driving assistance method, comprising:

acquiring switch information indicating a switch from a first travelling operation state, in which a driving assistance section performs driving assistance processing that assists driving of a vehicle by an occupant of the vehicle, to a second travelling operation state, in which the occupant drives the vehicle manually;

acquiring information indicating a degree of tension of the occupant; and in cases in which the switch information has been acquired, causing a first level of tactile stimulus, corresponding to the degree of tension, to be presented by a part of the vehicle to the occupant of the vehicle, and subsequently causing the presented level of the tactile stimulus to transition from the first level of the tactile stimulus to a second level of the tactile stimulus that is determined for when the occupant manually drives the vehicle, the second level being different from the first level.

7. A non-transitory computer-readable storage medium storing a driving assistance program that causes a computer to execute processing, the processing comprising:

acquiring switch information indicating a switch from a first travelling operation state, in which a driving assistance section performs driving assistance processing that assists driving of a vehicle by an occupant of the vehicle, to a second travelling operation state in which the occupant drives the vehicle manually;

acquiring information indicating a degree of tension of the occupant; and in cases in which the switch information has been acquired, causing a first level of tactile stimulus, corresponding to the degree of tension, to be presented by a part of the vehicle to the occupant of the vehicle, and subsequently causing the presented level of the tactile stimulus to transition from the first level of the tactile stimulus to a second level of the tactile stimulus that is determined for when the occupant manually drives the vehicle, the second level being different from the first level.

* * * * *